July 7, 1931.  C. G. KING  1,812,962

PISTON RING COMPRESSOR

Filed July 9, 1928

INVENTOR.
Charles G. King
BY Morsell, Kinney & Morsell

ATTORNEYS.

Patented July 7, 1931

1,812,962

UNITED STATES PATENT OFFICE

CHARLES G. KING, OF MILWAUKEE, WISCONSIN

PISTON RING COMPRESSOR

Application filed July 9, 1928. Serial No. 291,319.

This invention relates to improvements in piston ring compressors.

It is one of the objects of the present invention to provide an adjustable piston ring compressor which will fit all sizes of pistons and will hold the piston rings firmly in position on a piston while the latter is being inserted into its cylinder bore.

A further object of the invention is to provide a piston ring compressor in which the adjustment to clamp the rings on a piston is made very simply by means of a chain and several turns with a thumb nut.

A further object of the invention is to provide a piston ring compressor which eliminates the use of pliers, tongs or other tools.

A further object of the invention is to provide a piston ring compressor which compresses simultaneously all of the rings on a piston.

A further object of the invention is to provide a piston ring compressor which is of very simple construction, is strong and durable, is inexpensive to manufacture, is easy and quick in manipulation, and is well adapted for the purposes described.

With the above and other objects in view the invention consists of the improved piston ring compressor and its parts and combinations as set forth in the claims, and all equivalents thereof.

In the accompanying drawings in which the same reference characters indicate the same parts in all of the views.

Figure 1:
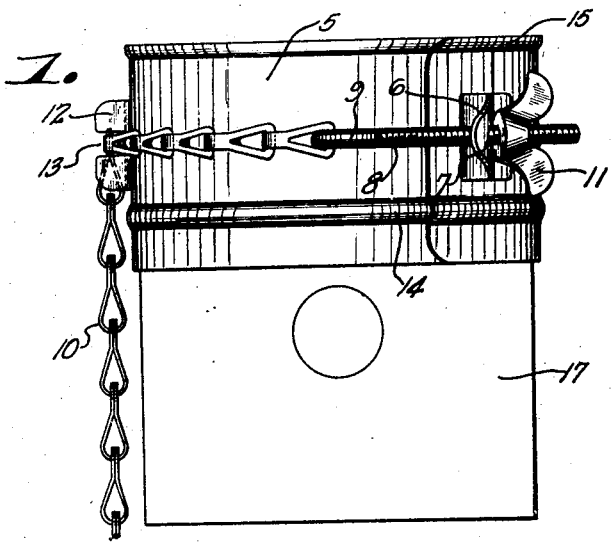
Fig. 1 is a side view showing the piston ring compressor in position on a piston prior to the insertion of the piston into a cylinder bore.
Figure 2:
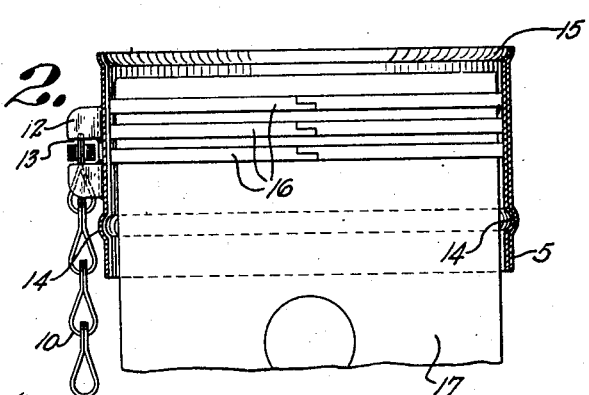
Fig. 2 is a longitudinal sectional view taken on line 2—2 of Fig. 3.
Figure 3:
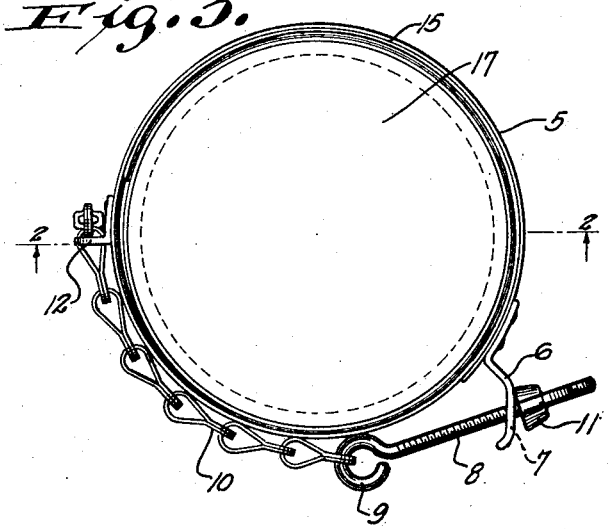
Fig. 3 is a plan view of the device on a piston.

Referring now more particularly to the drawings it will appear that the numeral 5 indicates the improved piston ring compressor and the same is in the form of a strip of sheet metal bent into circular form with overlapping end portions so as to be in a yieldable convolute form.

The outer end portion of the device has secured thereto a bracket 6 formed with an aperture 7 and a screw 8 extends loosely through said aperture. The head of the screw is eyed, as at 9, and has connected thereto one end portion of a chain 10. A winged nut 11 is threaded onto the shank portion of the screw and engages the bracket 6.

A medial portion of the member 5 has secured thereto an outwardly projecting bracket 12 formed with a slot or recess 13. In adjusting the device the chain 10 is pulled taut and is inserted into the slotted bracket 12 where a widened portion of the chain engages the bracket, as shown, preventing longitudinal withdrawal.

It is to be noted that the member 5 is formed with a longitudinal bead or offset portion 14 which forms a recess on the inner surface of the outer layer engaged by the beaded portion of the inner layer, whereby the inner layer is held in alinement with the outer layer during use. Also one end portion of the member is slightly outwardly flared or offset as at 15, so that the offset portion of the inner layer engages the offset portion of the outer layer to further keep the two layers in alignment and to form a portion for engagement with the end of the cylinder.

In some cars, pistons are inserted from the top of the cylinders, while in other cars pistons are inserted from below the cylinders. The present device may be used to equal advantage in either case, the only requirement being that the compressor be disposed so that its flared end portion 15 be directed toward the end of the cylinder bore from which entrance is to be made. In use, piston rings 16 are positioned in their grooves on the piston 17 and the compressor is inserted thereon, as shown. First, the chain 10 is pulled taut and inserted in the lug recess 13 and then the compressor is further adjusted by turning the winged nut 11 inwardly on the screw 8, which draws on the screw and chain and further compresses the device, holding the piston rings in position on the piston. Then, the flared end portion of the compressor is placed against the cylinder bore, and the piston is pushed through the compressor into the cylinder bore, and the piston rings are maintained in proper position.

From the foregoing description it will be seen that the piston ring compressor has two means of adjustment, will fit any size of piston and hold any number of rings thereon. Furthermore, the device is of simple and novel construction and is well adapted for the purpose set forth.

What I claim as my invention is:

1. A piston ring compressor, comprising a sheet metal member in convolute form and having a natural expansibility, said member having means formed directly therein for preventing lateral displacement of the convolutions with respect to each other, flexible means for releasably holding said member in an adjusted compressed position, and other means for further compressing said member.

2. A piston ring compressor, comprising a sheet metal member in convolute form and having a natural expansibility, said member being formed with annular rib means for preventing lateral displacement of the convolutions with respect to each other, a slotted lug projecting outwardly from an intermediate portion of said sheet metal member, an apertured bracket secured to the outer end portion of said sheet metal member, a screw extending loosely through said member, an elongated tie member secured to the inner end portion of said screw and quickly releasably engageable with said slotted lug, and a nut threaded onto the outer end portion of said screw and engageable with said bracket.

3. A piston ring compressor comprising a sheet metal member in convolute form and having a natural expansibility, said member being formed with a longitudinal bead, the beads of the convolutions engaging one another to prevent lateral displacement of the convolutions with respect to one another, and means for releasably holding said member in adjusted compressed position.

4. A piston ring compressor comprising a split spring band in circular form having normally overlapping portions said overlapping portions being formed with elongated offset portions extending lengthwise of the band which register with one another to prevent lateral edgewise movement of the overlapping portions with respect to one another and means for releasably holding the band in adjusted compressed position.

5. A piston ring compressor comprising a sheet metal member in convolute form and having a natural expansibility, said member being formed with a pair of spaced apart parallel, elongated longitudinally extending offset portions, the offset portions of the convolutions engaging one another to prevent lateral displacement of the convolutions with respect to one another, and means for releasably holding said member in adjusted compressed position.

6. A piston ring compressor comprising a convolute yieldable member variable as to its convolved form, an elongated flexible member in connection with a portion of said yieldable member, a perforated bracket in connection with another portion of said yieldable member, a threaded member extending through the perforation of said bracket and connected to said flexible member, and a nut threaded on said threaded member and engageable with said bracket for tightening the elongated member to compress the convolute member, the perforated portion of the bracket being at an angle to the side of the convolute member to permit manipulation of the nut without interference from said side of the convolute member.

In testimony whereof, I affix my signature.

CHARLES G. KING.